US008869256B2

(12) United States Patent
Sample et al.

(10) Patent No.: US 8,869,256 B2
(45) Date of Patent: Oct. 21, 2014

(54) NETWORK AGGREGATOR

(75) Inventors: Neal Sample, Santa Cruz, CA (US);
Paul Lo, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1275 days.

(21) Appl. No.: 12/359,232

(22) Filed: Jan. 23, 2009

(65) Prior Publication Data

US 2010/0100952 A1    Apr. 22, 2010

Related U.S. Application Data

(60) Provisional application No. 61/107,331, filed on Oct. 21, 2008.

(51) Int. Cl.
H04L 29/06      (2006.01)
H04L 12/58      (2006.01)
H04L 29/08      (2006.01)

(52) U.S. Cl.
CPC ........ *H04L 67/2823* (2013.01); *H04L 12/5835* (2013.01); *H04L 67/1095* (2013.01); *H04L 63/0815* (2013.01); *H04L 51/066* (2013.01); *H04L 63/0807* (2013.01)
USPC ....................................... 726/9; 726/5; 726/8

(58) Field of Classification Search
CPC .. H04L 63/0815; H04L 63/08; H04L 67/2823
USPC ............................................. 726/5, 9, 27, 8
See application file for complete search history.

(56) References Cited

U.S. PATENT DOCUMENTS

| 5,634,053 | A | 5/1997 | Noble et al. |
| 6,175,858 | B1 | 1/2001 | Bulfer et al. |
| 6,801,603 | B1 | 10/2004 | Arev et al. |
| 7,454,794 | B1 * | 11/2008 | Hibberd .......................... 726/27 |
| 7,673,327 | B1 * | 3/2010 | Polis et al. ......................... 726/5 |
| 2004/0003112 | A1 | 1/2004 | Alles et al. |
| 2006/0274869 | A1 | 12/2006 | Morse |
| 2007/0136586 | A1 | 6/2007 | Barrett |
| 2007/0288636 | A1 | 12/2007 | Rogers et al. |
| 2009/0083367 | A1 * | 3/2009 | Li et al. ......................... 709/202 |

FOREIGN PATENT DOCUMENTS

EP    1087308    3/2001

OTHER PUBLICATIONS

International Search Report and Written Opinion issued in PCT/US2009/058613 mailed May 18, 2010.
International Preliminary Report on Patentability for International Patent Application No. PCT/US2009/058613 mailed May 5, 2011.
Official Communication for Taiwanese Patent Application No. 98134048 dated Sep. 28, 2012.

* cited by examiner

*Primary Examiner* — Jeffrey Pwu
*Assistant Examiner* — Thong Truong
(74) *Attorney, Agent, or Firm* — James J. DeCarlo; Greenberg Traurig, LLP

(57) ABSTRACT

A device, system and method for aggregating resources, services or data across a network in which data and services from various source networks can be converted into an internal, aggregatable form (or vice versa) that can be sent to relevant properties or systems on request or through scheduling. The framework of the device, system and method permits scalability and potentially support any number of users, applications and services.

28 Claims, 9 Drawing Sheets

NETWORK AGGREGATOR

CROSS REFERENCE TO RELATED APPLICATIONS

This application claims the benefit of U.S. Provisional Application Ser. No. 61/107,331 filed on Oct. 21, 2008, the benefit of the earlier filing date of which is hereby claimed under 35 U.S.C. §119(e) and further incorporated by reference.

TECHNICAL FIELD

The present invention relates generally to a system and method for processing data from a conglomerate of networks, each of which may involve different authentication mechanisms, separate data formats and/or different system behaviors. More particularly, the invention allows the sharing of components and creates a common architecture that permits effective and efficient access to data that is contained within multiple networks, in which such networks require some form of authentication and interaction to access such data.

BACKGROUND

The Internet provides a number of ways for individuals to communicate with one another. A user may have one or more e-mail accounts, instant messaging accounts, Twitter accounts, blogs, and the like. There are also multiple social networking websites available in which individuals can post, send or receive information, such as through Yahoo!, MySpace, Facebook and YouTube. The accounts may have parts that are publicly accessible, but may have other parts that have limited accessibility. Access may be limited to a group of individuals or only to the user. Access is generally controlled through authorization protocols. As an example, most if not all of these accounts require a username that acts to identify the individual seeking access and a password or code. The password or code prevents unauthorized persons from using the username to gain access to the website. Some web sites employ additional layers of security to assure that access is limited only to authorized users. In addition, the information or data in each of these websites or accounts may be in various formats, some of which may be proprietary to the website. Importing and exporting data by a user or by external programs may be difficult and time consuming.

As an example, a person may have multiple email accounts through different providers, such as a work email address, a personal email address and a family email address. Each of these accounts may have a different username and password associated with the account, which must be provided before the user may access any information from these accounts. Each of these accounts is accessible through the Internet, but the data contained in many of these accounts are in various formats since these accounts may originate from different service providers. Each of the service providers may also use different methods of communication when a user seeks to obtain information from these accounts. For example, the log on and authentication procedures for these accounts may differ from provider to provider.

Many of these user accounts have information that may be useful if aggregated or collected into a single location and/or distributed between various accounts. For example, photos contained within an account such as those provided by Flickr may be useful if aggregated together with an account relating to Yahoo! personals, Facebook or Twitter. This cross-networking of social information and communications can increase user engagement, improve insights and allow cross-promotion. It would also allow the aggregation of contacts and synchronization of information across various sources and/or accounts. There are some services for aggregating limited amounts of information of a user such as a service provided by Plaxo. However, these services provided limited capabilities of information aggregation.

Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
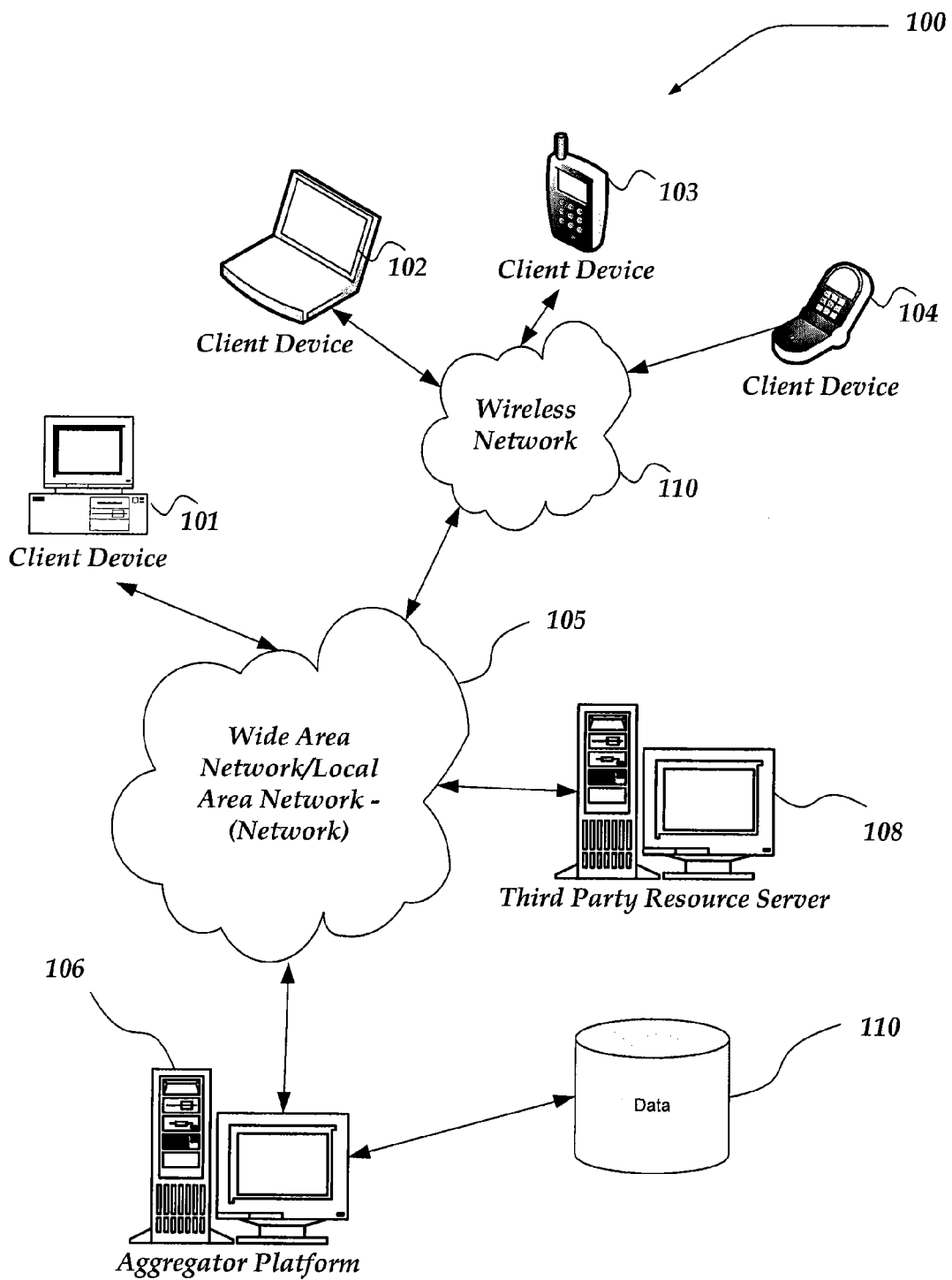
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments of the invention. However, this invention may be embodied in many different forms and should not be construed as limited to the embodiments set forth herein. Rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. Therefore, the following detailed description is not to be taken in a limiting sense.

Throughout the specification and claims, the following terms take the meanings explicitly associated herein, unless the context clearly dictates otherwise. The phrase "in one embodiment" does not necessarily refer to the same embodiment, although it may. Furthermore, the phrase "in another embodiment" does not necessarily refer to a different embodiment, although it may. Thus, as described below, various embodiments of the invention may be readily combined without departing from the scope or spirit of the invention.

The term "aggregator", "aggregator network" or "Aggregator Run-time Platform" means a network that fulfills a request for the aggregation/syndication of services or information.

The term "credentials" means an identifier or code or a set of identifiers or codes that may or may not be unique to a user that are necessary to gain access to a user's account through a network system. Examples of credentials would be a user name, a password, the combination of a user name and password, the combination of a user name and verification code or any other identifier that permits access to a user account.

A "native network" is a network that a user has access to through the use of an access code. An aggregator network may be the same as the native network, but the two may also be separate.

A "source network" or a "non-native network" is a system that contains data or information that is accessible through a network and contains user accounts that are accessed through access codes.

The term "vitality events" means an on-line activity that is initiated or created by a user as opposed to initiated or created through an automated process.

The following briefly describes the embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

The network aggregator may provide an overall aggregation framework where an expandable set of properties or service platforms may become the syndicator or aggregator on given classes of data or services by leveraging the Aggregator Run-time Platform as a pipeline infrastructure that connects the network to other source networks, and converts data and services from the various source networks into an internal, aggregatable form that could be sent to the relevant properties or systems. This framework may scale relative to an organization and potentially support any number of users, applications and services more easily than one where a single system handles all network aggregation related operations.

The network aggregator may be structured so that it may receive and process requests that are arranged in a global format. This would permit requests to be made from resources located in both native and non-native networks. The network aggregator may also provide the requested data in a global data format that is easily readable and capable of being processed by the resources connected to the network that may use network aggregation services. This would make the network aggregator services independent of the data formats used by the requesting resource. Alternatively, the network aggregator may provide conversion services to commonly used data formats in fulfilling the aggregation requests.

Aggregation may apply on top of other properties or more elementary service platforms to construct higher-order or more complex processes or services. For instance, one may want to join vitality events with data from a photo service that provide an index on top of photo references from various networks. Each relevant property or service platform may expose a set of web services with appropriate web services filters to facilitate the necessary query and joint operations. Such a joint operation should normally be done only among data that are authorized for access by the same account user. Cross-service aggregation is also useful for global optimization or analytics purposes. For example, better look-ahead optimization for the Aggregator Run-time Platform may be obtained by looking at past usage patterns of the various source networks across services and providing proper feedback via an adaptive scheduling scheme that attempts to pull data or request services proactively from the various source networks before the services or data is needed by the endpoints. Similarly, other business analytics or data mining may also be performed on the global aggregate to provide insights for ad targeting, improving relevance of services offered, decision support, etc.

The Aggregator Run-time Platform is basically a pipeline infrastructure that transforms services or data from other networks into an internal, aggregatable form (or vice versa) such that cross-network services could be built effectively and efficiently on top of it. It may employ global formatting for requests and for data that fulfills the request so that the services and data may be transferred without the need for customized interfacing protocols on a resource by resource basis.

The Network Aggregator framework may include the following:

- A standard 3rd party user credential management framework with Application Program Interface ("API") and User Interface ("UI") components for handling 3rd party user credentials and authentication in a managed, protected environment
- A standard service map and an internal, canonical data schema or representation for conversion between the source networks and the Aggregator Run-time Platform
- An extendible plug-in architecture with well-defined interfaces to provide logic that performs such conversion as well as re-usable tools that facilitate future development on the Aggregator Run-time Platform
- A protocol for properties to request services from given source networks via the Aggregator Run-time Platform
- An adaptive scheduler that requests services from given source networks ahead of time based on expected usage patterns.
- A broadcasting framework for sending normalized data or results (or status change notifications) from the Aggregator Run-time Platform to the relevant properties or systems.

As one example, photo sharing is the publishing or transfer of a user's digital photos online, thus enabling the user to share them with others whether publicly or privately. This functionality is provided through both websites and applications that facilitate the upload and display of the images. There are quite a number of online photo sharing websites, each requiring access through a username and password. In one embodiment of the invention, all of the pictures may be collected from several different photo sharing websites such as Flickr, Shutterfly, Snapfish and other photo sharing websites with which the user may have accounts. The system and method would request from the user the username and password for each of these accounts, and then automatically access the accounts and transfer the images to one aggregating location. In collecting the photo galleries into one location, the system and method may convert the photos into a standard format so that all of the photos can be accessed through the same software and in the same manner. This would permit users to migrate and combine data from various separate networks into one location using one service provider.

As another example, a user may seek to aggregate their various contacts through various email accounts. Again, the user may be required to provide the username or email address and password for each account they seek to aggregate. Alternatively, the access codes for each of the various accounts may be stored in the user's profile and may be automatically retrieved by the system. The system would interact with each of the email accounts to extract the information relating to the user's contacts and aggregate such contacts within a single network location. The network contacts may be converted from different proprietary formats into a single format to be used within the aggregated network system.

The data/service aggregation system and method described may also be used to identify patterns across various networks to improve insights into user behavior and provide suggestions to the user. In addition, the aggregation of information is not limited to a single time, but may be conducted on a periodic basis.

In one embodiment of the system, a user may aggregate various social contacts that originate from different systems connected through the Internet. As an example, a user may seek to consolidate the online activities relating to a select group of individuals. The user may seek to consolidate Facebook accounts, Twitter accounts, emails, instant messaging, and the like for a select group of friends. The system would connect with each of the separate systems, provide the necessary authorization code for access, transfer the information to a central system and convert the information into a harmonized data format. The access to these various accounts can occur periodically so the user has up-to-date information. The system may also collaborate with various network providers such that their systems are set up to push data or send notification to the aggregation system or to invalidate data that was previously obtained if such data is out-of-date. The aggregation system would convert the data into a harmonized data format for downstream processing. Whether the former or the later approach, this may reduce or eliminate the need to visit these individual network locations when the data is needed by the end users while maintaining a reasonable effective freshness of the data.

In another embodiment of the system, a user may aggregate information contained both in on-line activities that require an access code for information transfer and from information that is publicly available, that is, does not require an access code. In yet another embodiment of the system, the system provides a framework so that data from external sites protected by access codes and located on the web may be transferred for use in programs or activities that are only in-directly related to a user's activities. For example, the system may be used to aggregate financial information of a user for the purpose of financial planning, wherein the data is obtained, analyzed and recommendations are provided without providing the user with the underlying data. The same data may also be used for other purposes such as, for example, tax reporting.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, client devices 101-104, aggregator platform 106, and third party resource server 108.

Generally, client devices 102-104 may include virtually any mobile computing device capable of receiving and sending communications over a network, such as wireless network 110, or the like. Such devices include portable devices such as, cellular telephones, smart phones, pagers, radio frequency (RF) devices, infrared (IR) devices, Personal Digital Assistants (PDAs), handheld computers, laptop computers, wearable computers, tablet computers, integrated devices combining one or more of the preceding devices, or the like.

One embodiment of a mobile device usable as one of client devices 102-104 is described in more detail below in conjunction with FIG. 2.

Client device 101 may include virtually any computing device that typically connects using a wired communications medium such as personal computers, multiprocessor systems, microprocessor-based or programmable consumer electronics, network PCs, or the like. In one embodiment, client devices 101-104 may be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send communications.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), network address, or other device identifier. The information may also indicate a content format that the client device is enabled to employ. Such information may be provided in a communication, or the like, sent to another computing device.

Client devices 101-104 may also be configured to communicate through email, Short Message Service (SMS), Multimedia Message Service (MMS), instant messaging (IM), internet relay chat (IRC), Mardam-Bey's IRC (mIRC), Jabber, or the like, with and between another computing device. However, the present invention is not limited to these communication protocols, and virtually any other communication protocol may be employed. Client devices, such as client device 112, may be configured to implement transmission of voice through the internet or other packet-switched networks through Voice-over-Internet protocol (VoIP). Client devices 101-104 may further be configured to include a client application that enables the user to log into a user account that may be managed by another computing device, such as third party resource server 108, platform 106, or the like. Such user account, for example, may be configured to enable the user to receive emails, send/receive IM messages, SMS messages, access selected web pages, participate in a social networking activity, provide messages that may include links or attachments, or the like. However, managing of communications may also be performed without logging into the user account.

One example of an account managed by another computing device, such as third party resource server 108, is Twitter. Twitter is a social networking and micro-blogging service that allows users to send "updates" (or "tweets"; text-based posts, up to 140 characters long) to the Twitter web site, via the Twitter web site, short message service (SMS), instant messaging, or a third-party application such as Twitterrific or Facebook. Updates are displayed on the user's profile page and instantly delivered to other users who have signed up to receive them. The sender can restrict delivery to those in his or her circle of friends (delivery to everyone is the default). Users can receive updates via the Twitter website, instant messaging, SMS, RSS, email or through an application.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, or the like. Access technologies such as 2G, 3G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple aggregator platform 106 and its components with other computing devices, including, third party resource server 108, client device 101, and through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as twisted pair, coaxial cable, fiber optics, wave guides, and other wired media and wireless media such as acoustic, RF, infrared, and other wireless media.

One embodiment of aggregator platform 106 is described in more detail below in conjunction with FIG. 3. Briefly, however, aggregator platform 106 may include any computing device capable of connecting to network 105 to enable managing of resources and the transfer of information to and from a user.

In one embodiment of the system, aggregator platform 106 may collect and store information relating to all of the user's accounts, including information about the address or location of the system that hosts the user's account, the user's access code (including a username, password and/or any other identifying information), the user's preferences and any other information that may be relevant when accessing the user's account. Aggregator platform 106 may also contain programs that may manage access to the user's accounts, including managing the authentication process for accessing the data, initiating the request to transfer data, handling the receipt of such data and then terminating access to the user's account. The platform may also convert the data into a standard format and provide application programs that use such data or may transfer the data to other programs or systems that requested the data.

It should be noted that while FIG. 1 illustrates a use of aggregator platform 106 to manage resources and transfer data, the invention is not so limited. For example, as noted above, client devices 101-104 may also be configured with a client application, script, plug-in, widget, applet, or the like, that is configured and arranged to enable the client device to manage resources or transfer information either to or from a user. Moreover, in another embodiment, various functions performed by aggregator platform 106 may be distributed across a plurality of network devices or client devices.

Devices that may operate as aggregator platform 106 may include personal computers, desktop computers, multiprocessor systems, microprocessor-based or programmable consumer electronics, network PCs, servers, or the like.

Third party resource server 108 includes virtually any network computing device that is configured to provide various resources, including data, content and/or services over network 105. As such, third party resource server 108 represents one embodiment of such a system. Server 108 may provide access to any of a variety of content or services, including, but not limited to messages, such as emails, SMS messages, IM messages; search results; news; articles; websites; hyperlinks; ads; reviews; photos; information; services; as well as content that may include audio files, video files, text files, streaming files, graphical files, or the like. Thus, virtually any content or service may be available through third party resource server 108 for access by client devices 101-104. In one embodiment, server 108 might be configured and arranged to provide a website for users to post, view, link to, and/or otherwise access, content. Server 108 might also provide FTP services, APIs, web services or database services. In addition, server 108 may also provide a messaging service, such as an email server, text messaging server, or the like. However, server 108 is not limited to these mechanisms, and/or content, and others are envisaged as well.

Third party resource server 108 may include an interface that may request information from a user of client devices 101-104. For example, server 108 may provide access to an account, which may request user log-in information. Such log-in information may include a user name, password, or other identifier of the user and/or client device used by the user. Moreover, server 108 may also be configured to manage information for a user, such as an address book, buddy list, or other type of contact list. Such contact lists may be made available to aggregator platform 106, in one embodiment.

Devices that may operate as server 108 include, but are not limited to personal computers, desktop computers, multiprocessor systems, microprocessor-based or programmable consumer electronics, network PCs, servers, network appliances, and the like. Moreover, while aggregator platform 106 and third party resource server 108 are illustrated as distinct devices, the invention is not so limited. For example, in one embodiment, aggregator platform 106 and third party resource server 108 may be implemented within a single network device, or distributed across a plurality of network devices.

Illustrative Client Environment

Figure 2:
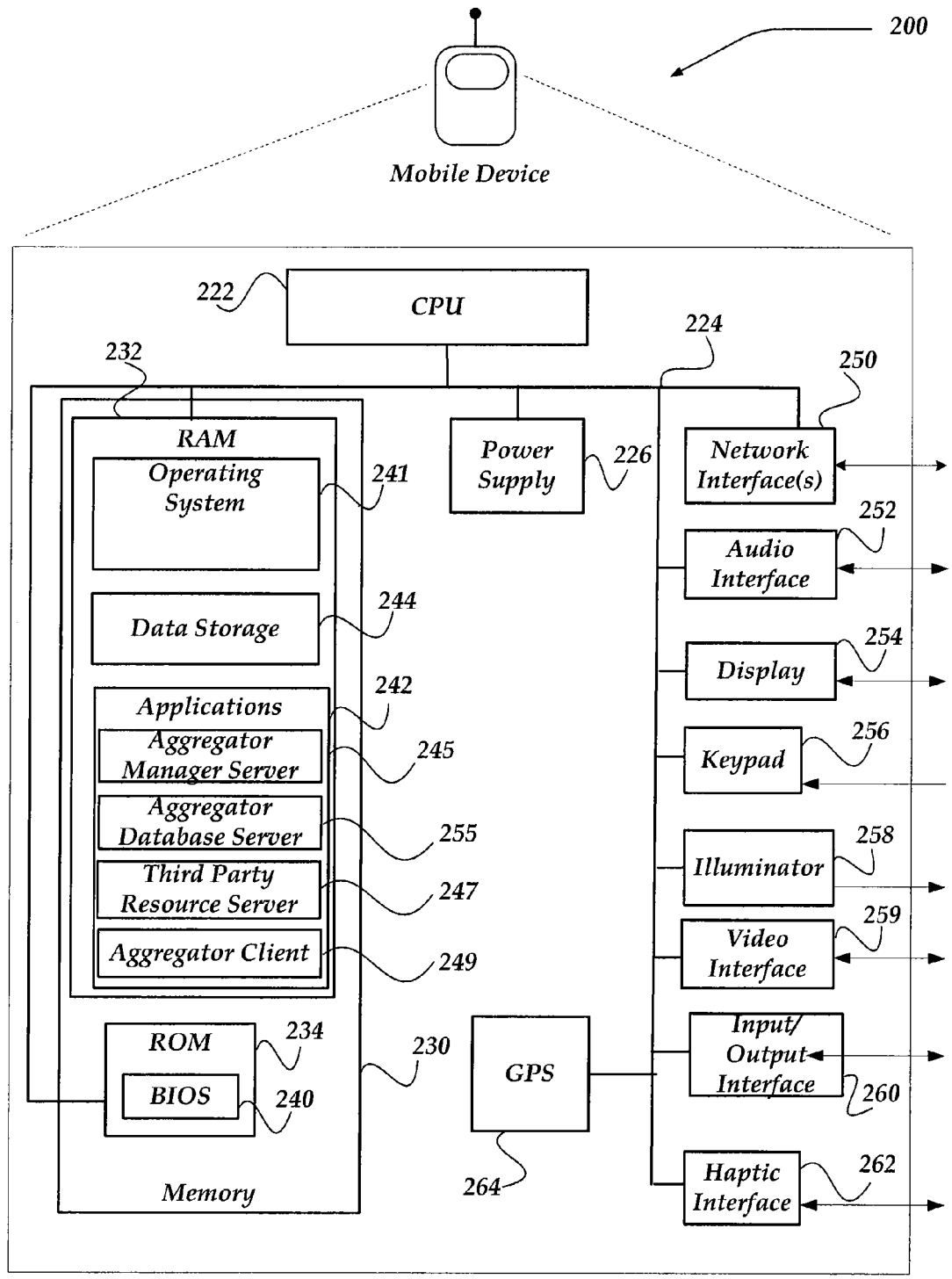
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, one of client devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like. This physical location of the device and/or change in physical location of the device may be used as part of the condition-related status of the user or as part of the condition under which communications may be made with the user.

Mass memory 230 includes a RAM 232, a ROM 234, and other storage means. Mass memory 230 illustrates another example of computer readable storage media for storage of information such as computer readable instructions, data structures, program modules, or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, the Symbian® operating system, or Y! GO. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. Memory 230 can also be used to store the user's access codes for various accounts. For example, data storage 244 may also be employed to store information that describes various capabilities of mobile device 200. The information may then be provided to another device based on any of a variety of events, including being sent as part of a header during a communication, sent upon request, or the like. Moreover, data storage 244 may also be employed to store personal information including but not limited to address lists, contact lists, personal preferences, or the like. Data storage 244 may also include some profile information. At least a portion of the information may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 242 may also include Aggregator Manager Server (AMS) 245 and Aggregator Database Server 255. Applications 242 may also include third party resource server 247 and aggregator client 249. Aggregator Database Server 255 may be any application program for managing the database of a user, as described further below. In one embodiment, AMS 245 may be a browser application. In another embodiment, AMS 245 may be a browser application with a downloadable plug-in, script, applet, widget, or the like, that is configured and arranged to manage resources.

AMS 245 may include a browser application configured to receive and display graphics, text, multimedia, and the like, employing virtually any web-based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send messages. However, any of a variety of other web based languages may be employed.

AMS 245 may further be configured as a messenger application that is configured to send, to receive, and/or to otherwise process messages and data using SMS, MMS, IM, email, VOIP, and/or any of a variety of other communication protocols. Although a single AMS 245 is illustrated it should be clear that multiple applications may be employed. For example, one ASM 245 may be configured to manage SMS messages, where another application may manage IM messages, and yet another messaging client is configured to manage emails, or the like.

Mobile device 200 may also be a resource for the aggregator platform 106 and/or may also be an aggregator client. As an example, third party resource server 247 may be an application in mobile device 200 so that aggregator platform 106, or aggregator manager server 245, may have access to the resources of mobile device 200. Likewise, mobile device 200 may also be an aggregator client or requester through aggregator client 249.

Illustrative Network Device Environment

Figure 3:
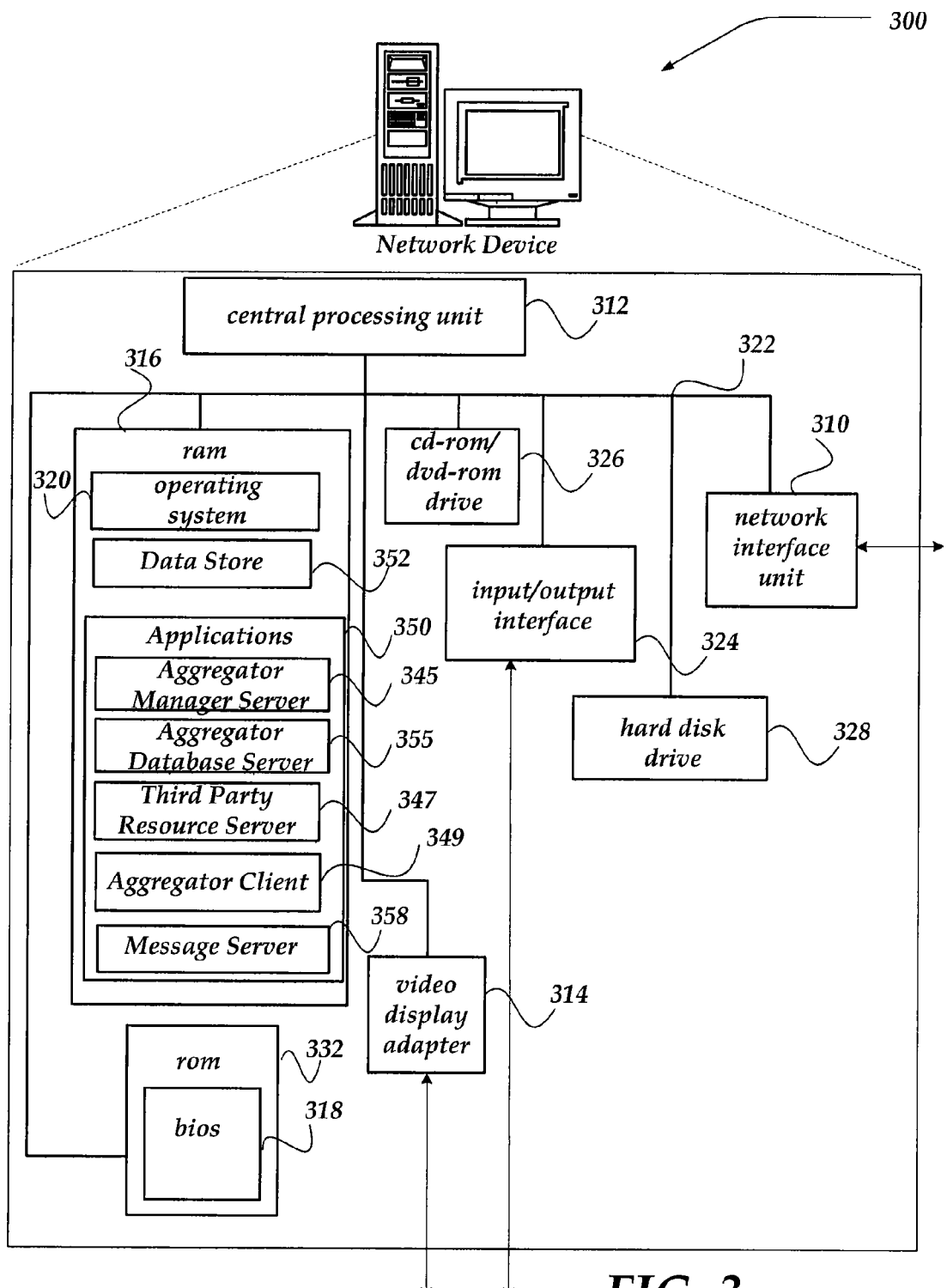
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, aggregator platform 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer readable storage media. Computer readable storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include Aggregator Database Server (ADS) 355, Aggregator Manager Server 345, third party resource server 347, aggregator client 349 and message server 358. These applications can be based in the network device, in the mobile device, or in a distributed network. Thus, the invention may be implemented in a traditional client server arrangement, in a peer to peer network or any other architecture. Alternatively, the invention may be implemented as a software client run on currently existing platforms. A widget or messenger plug-in could implement the applications, wherein the applications are defined only within the application layer. The mass memory can also alternatively store the user's access information within data store 352, and/or cd-rom/dvd-rom drive 326, hard disk drive 328, or other computer readable storage medium (not shown).

Generalized Operation

Figure 4:
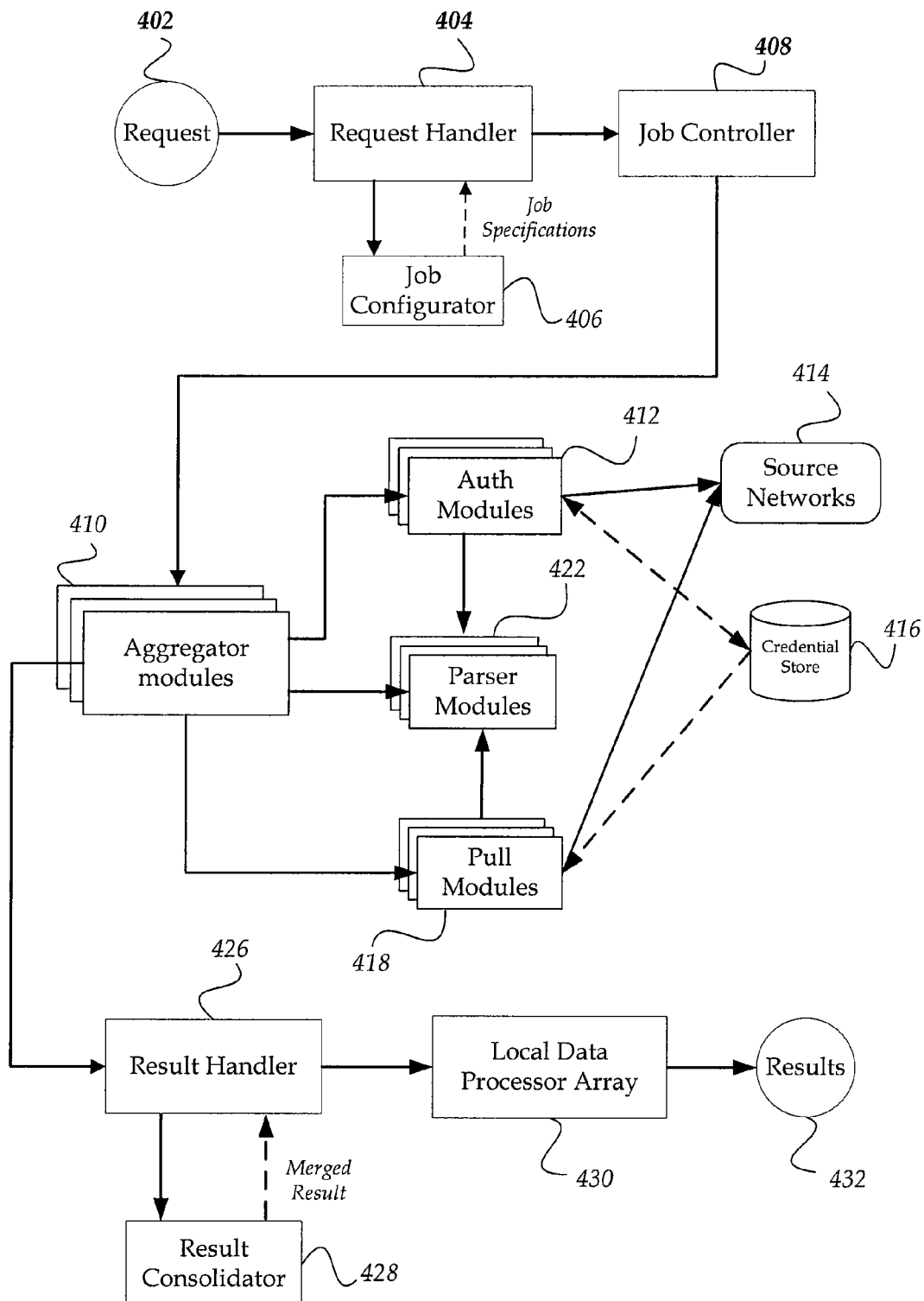
FIG. 4 shows a system diagram for one embodiment of the invention.

The structure of one embodiment of the method and system of the invention will now be described with respect to FIG. 4. FIG. 4 illustrates a system diagram showing the various components for implementing the invention. The system shown in FIG. 4 is, for convenience only, generally referred to as the Aggregator Run-Time Platform (or "aggregator").

Aggregator Run-time Platform

The Aggregator Run-Time Platform orchestrates the overall process of authentication, data extraction, aggregation, and sending results to entities that need them. It may have a plug-in architecture that enables various communication modules and processors to be plugged in via standard interfaces without changing the implementation of the run-time platform itself. In one embodiment, it has two main external interfaces, one being a pull interface to request data, and the other being a push interface to inject content from an external source into the system.

The aggregation process begins by receiving aggregation request 402 as shown in FIG. 4. The request may come from within the aggregator, from a requestor within the native network or from a requester from non-native networks. The requester may be a program or application. The request may consist of a request for data or information, may consist of a request to retrieve and process information or any other similar service requests. The request is received and processed by request handler 404. Request handler 404 proxies the aggregator request between the end-point and the underlying computational units. It converts a given request into a set of job specifications via job configurator 406, and sets up job controller 408 to dispatch the necessary aggregator modules based on the job specifications. It may also collect results from the job controller and send the response back to the end-point. The aggregation and processing of results from the aggregator modules are handled by result handler 426, which may be initiated by job controller 408 after the results have been received from the aggregator modules. Request handler 404 may or may not trigger result handler 426 directly.

Job configurator 406 determines job specifications that are submitted to job controller 408 for execution and may also determine the parameters required to process the resulting data in local data processor array 430. Job configurator 406 may review the various request segments from the aggregator request and identify a set of jobs that need to be executed to fulfill the request efficiently and effectively. Each job may involve an instance of aggregator module 410 and a set of job parameters.

Job controller 408 takes a set of job specification, maintains and dispatches the jobs to fulfill the aggregator requests. It may maintain and limit concurrency and perform optimization as needed for the jobs. For example, job controller 408 may reduce aggregate latency, determine which jobs go into the active job queue based on priorities, parse or combine requests . . . etc. Job controller 408 may be given time constraints to complete a given set of jobs. The requester may pose a limit on the time for results in a synchronous response. In such a case, job controller 408 may dispatch separate jobs for any jobs that have not been completed within the set time period. A given aggregator request may be split into multiple jobs that are executed in different locations. For instance, authentication and data extraction that involve processing of third party user credentials may be required to reside within a special security zone while other processes not requiring security may be completed in other locations.

The functions of the request handler, job controller, aggregator modules and result handler are all potentially separate processes that may or may not be in the same location. However, these processes may be combined together in different manners and may or may not be modularized.

Aggregator modules 410 may provide the implementation for the actual orchestration among auth modules 412, pull modules 418 and parser modules 422, which perform the necessary authentication, data extraction, manipulation and aggregation for part or all of the original aggregator request. The initial jobs dispatched by job controller 408 are essentially aggregator module instances. Aggregator modules 410 may perform additional operations on the extracted data before returning the results to result handler 426. The results from aggregator modules 410 may be sent directly to result handler 426 or may be sent indirectly through job controller 408.

Aggregator modules 410 may be generated for a defined class of problems or jobs. For example, an aggregator module may specialize in extracting social user data from a given social network such as Facebook. Such an aggregator module may then be instructed to extract information via screen scraping or an API call per job specification. Depending on the preferred method, the aggregator module may trigger the appropriate auth modules, pull modules and parser modules. Aggregator modules 410 may also take advantage of cache or internal data stores to avoid unnecessary calls to external networks or data sources. Cache or data store may be written to directly by the aggregator modules or via local data processor array 430.

The communication modules encapsulate the protocol logic to communicate with a given target network or data source such that common processes could be build on top of a common data schema and interfaces. Each type of module may serve a well-defined class of needs. In one embodiment of the invention there are two main types of communication modules: auth modules and pull modules. In another embodiment of the invention, other types of modules encapsulate other forms of communication (e.g. updating data on 3rd party networks).

Auth modules 412 exchange user credentials, normally provided by the Aggregator Run-Time Platform, with session credentials (cookies, tokens, etc.) from a given network or data source. An intermediate step is sometimes involved where 3rd party credentials are retrieved via a common store by supplying the source credentials from the Aggregator Run-Time Platform. Such 3rd party credentials are then used by auth modules 412 to create a session with the 3rd party network. Each auth module may be specific to a given network and the collection of modules may be designed in such a way that the aggregator can effectively create the necessary sessions and maintain the sessions efficiently by selecting, configuring, and executing a relevant set of module instances. A set of auth modules may share a set of utilities or inherit from a common base implementation. The authentication should normally be done via API calls to the relevant network whenever possible. However, there may also be cases where the auth module may need to simulate some form of end-user experience and authenticate on behalf of the user via screen scrapping techniques.

Complex transformation of fetched data should normally be handled via parser modules 422 that are optimized for such purposes. An auth module should be accessed by the Aggregator Run-Time Platform via a standard interface and may be available as a shared library and/or a remote service. However, some networks provide sessions that are bounded to specific IP address. Hence the auth module and pull module being used for such a network should normally communicate with the network with the same exposed source IP address. The auth module should provide a reasonable level of configurability to prevent unnecessarily redundant implementations for similar usages. The auth module interface used by the aggregator may follow a common standard across modules and the data passed to or received via the interface may be in canonical, extensible format.

The session data may be cached by auth modules 412 to prevent unnecessary re-authentication with the corresponding networks. In cases where the auth/pull modules may need to be distributed over multiple machines, the cache may need to be distributed/replicated as well to eliminate or reduce the amount of remote calls to obtain session data from cache.

Pull modules 418 fetch content from a given network or data source and return the relevant bits of data in canonical form based on a given request. It contains the protocol logic needed to make the call to the given source, calls the appropriate parser modules 422 to extract the relevant information from the content fetched, and may return the resulting information in standard, canonical form.

A set of pull modules may share a set of utilities or inherit from a common base implementation. The pull should normally be done via API calls to the relevant data source whenever possible. A pull module should be accessed by the Aggregator Run-Time Platform via a standard interface and may be available as a shared library and/or a remote service. However, some networks may require the communication to happen from the same exposed source IP address as the one used for initiating the session, if any. In case the authentication to the given network is based on session that was generated via a separate process (e.g., via auth modules 412), the session credentials are normally passed to pull modules 418 as part of the request to the pull module. The pull module should provide a reasonable level of configurability to prevent unnecessarily redundant implementations for similar usages. The pull module interface used by the aggregator may follow a common standard across modules and the data passed to or received via the interface may be in canonical, extensible format.

Parser modules 422 extract the relevant bits from content fetched from a given network or data source and return the information in canonical, extensible forms that can be processed by the auth/pull modules or the Aggregator Run-Time Platform. A parser module can be a general parser (e.g. a generic screen scraping/extraction engine, RSS/ATOM feed parsers, microformat extractors, etc.) that determines how to extract information from raw content based on a configuration specification. The parser modules are normally available as shared libraries and used within a process rather than being a remote service due to the relatively large data that are passed in the request.

In one embodiment, pull modules 418 may support three modes of request: synchronous, asynchronous, timed. In the synchronous mode, the aggregator puts the caller on hold until all results relevant to the caller are available and the aggregator returns the results to the caller. In the asynchronous mode, the aggregator returns a receipt of acceptance of the request to the caller and the process may then happen offline without the caller being put on hold. The results may be consumed later by a separate process when they are available. In the timed mode, the aggregator puts the caller on hold until a given time limit is reached or the full results are available, whichever comes first. The aggregator returns as much relevant results to the caller as possible within the given time constraints, while the full results may be consumed later by a separate process when they are available. In the pull process, the aggregator selects, configures, and triggers the appropriate sets of auth module and pull module instances, which return data in canonical form. The aggregator then combines or merges the results into one resulting canonical structure that is passed to a configurable sequence of local processors (per aggregator instance) each of which implement a standard interface to accept and process the result data. The aggregator may also augment the result with additional information computed by some special processors (such as which data has changed since the last fetch). The set of local processors that are attached directly to the aggregator are executed in a pre-defined sequence, although a processor may in turn trigger multiple routines internally in parallel. The set of local processors being triggered should normally be completed within a reasonably short time frame since the aggregator will by default put the original caller on hold until all local processors return. The local processors are ideally lightweight adaptors that trigger processes that can be executed offline and the number of local processors should be kept minimal. One example of a local processor is an adaptor that takes the result from the aggregator and passes it along to a broadcasting engine that broadcasts various subsets of the result to processes that need to consume them. An adaptor may also cache certain data right away for cases where the aggregator or other entities may use the cache instead of fetching data from certain 3rd party networks again within a given time frame.

The request handler may also have a push interface that allows the aggregator to take content directly from external source such as data extracted by the user client or 3rd party data streams that are configured to be sent to the system. It is also possible that data passed to the push interface include data from multiple sources. The aggregator sets up and triggers the appropriate parser modules to split and extract the relevant information from the raw data and then process the resulting data in a similar fashion as in the case where data is returned from the pull modules. In some cases, the data being pushed may not contain all of the information that is needed by downstream consumers and the aggregator may need to go through a phase of auth and pull as well to fill in the missing gap (e.g. based on specifications from the source data).

The overall network aggregation architecture may scale with respect to load and data needs. Hence, the aggregator instances may be allowed to be spread over clusters of machines. It is also possible to have separate aggregator implementations for completely disjoint set of data and work involved.

Result handler 426 collects results from aggregator modules 410, combines or consolidates the results via result consolidator 428 and sends the results to local data processor array 430 for further processing. The final result may be presented back to the original requester via job controller 408 as one coherent response in the case of a synchronous aggregator request. In a timed request, request handler 404 may collect and process the results from the aggregator module instances that are available within the given time constraints. Results that are not available to the requester synchronously are submitted to the result handler offline as they become available.

Processing Protocols

For the request protocol, services or data from the various source networks may be available to other systems in several different ways. As apparent, the aggregator is basically a pipeline infrastructure that transforms services/data from other networks into an internal, aggregatable form (or vice versa) such that cross-network services could be built effectively and efficiently on top of it.

As part of this strategy, the Network Aggregator framework may include the following:

- A standard 3rd party user credential management framework with API and UI components for handling 3rd party user credentials and authentication in a managed, protected environment.
- A standard service map and an internal, canonical data schema/representation for conversion between the source networks and the Aggregator Run-time Platform.
- An extendible plug-in architecture with well-defined interfaces for developers to provide logic that performs such conversion as well as re-usable tools that facilitate future development on the Aggregator Run-time Platform.
- A protocol for properties or other systems to request services from given source networks via the Aggregator Run-time Platform.
- An adaptive scheduler that requests services from given source networks ahead of time based on expected usage patterns.
- A broadcasting framework for sending normalized data/results (or status change notifications) from the Aggregator Run-time Platform to the relevant properties or systems.

Figure 5:
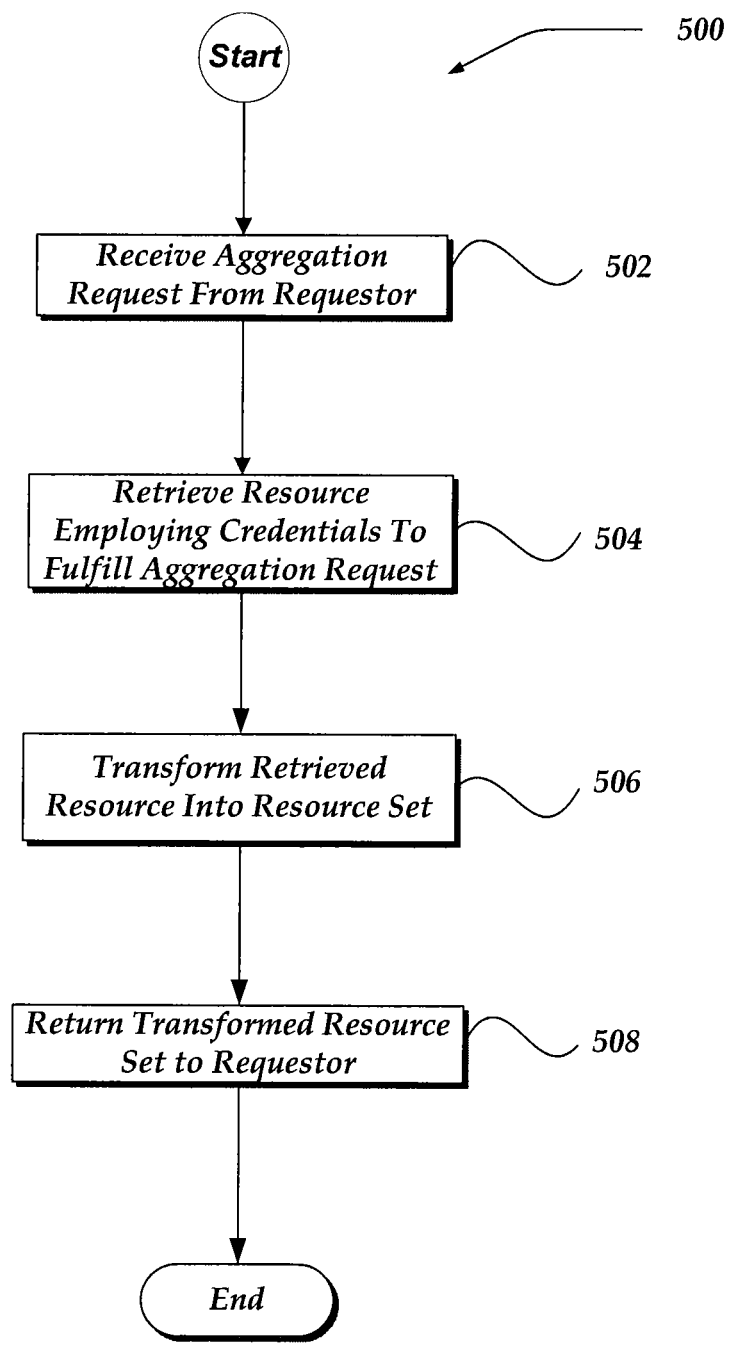
FIG. 5 shows a flow diagram for one method of implementing the invention.

The general flow of an aggregation request is shown in the flow of FIG. 5. An aggregation request is received from a requester in block 502. The aggregation request may be arranged in a global format so that various requesters from both native and non-native networks may access and use the aggregator platform. The aggregation request may seek information, content, data, services or the like from a designated resource. Alternatively, the aggregator platform may process the request and select an appropriate resource to fulfill the aggregation request. After receipt of the aggregation request, the Network Aggregator platform may determine if there are credentials associated with the aggregation request. The credentials may be provided as part of the aggregation request, may be stored based upon previous aggregation requests, may be obtained through a call to a third party service, or the Network Aggregator platform may request the credentials relating to aggregation request. Next, the Network Aggregator platform retrieves the requested resource by employing the credentials as shown in box 504. A resource may be any native or non-native content provider, service provider, user, website, server, or the like that has or provides data, information or services. The resources may be identified using a global resource identification scheme wherein the resources available to the Network Aggregator platform may be systematically identified and accessed.

Next, the data, information or service retrieved is transformed into a resource set that is accessible by the requester in block 508. Some of the resources available to the Network Aggregator platform may provide data in formats that may not be accessible to the requester of the aggregation services. In such an instance, the retrieved resource may be converted into a format accessible by the requester. This format may be a global format that is accessible by virtually any requester or may be a proprietary format particular to that requester.

Finally, in block 508 the transformed resource set is returned to the requester to fulfill the aggregation request. This may be achieved by transferring the information, data or services to the requester, or through some other type of access facilitated by the Network Aggregator platform.

Figure 6A:
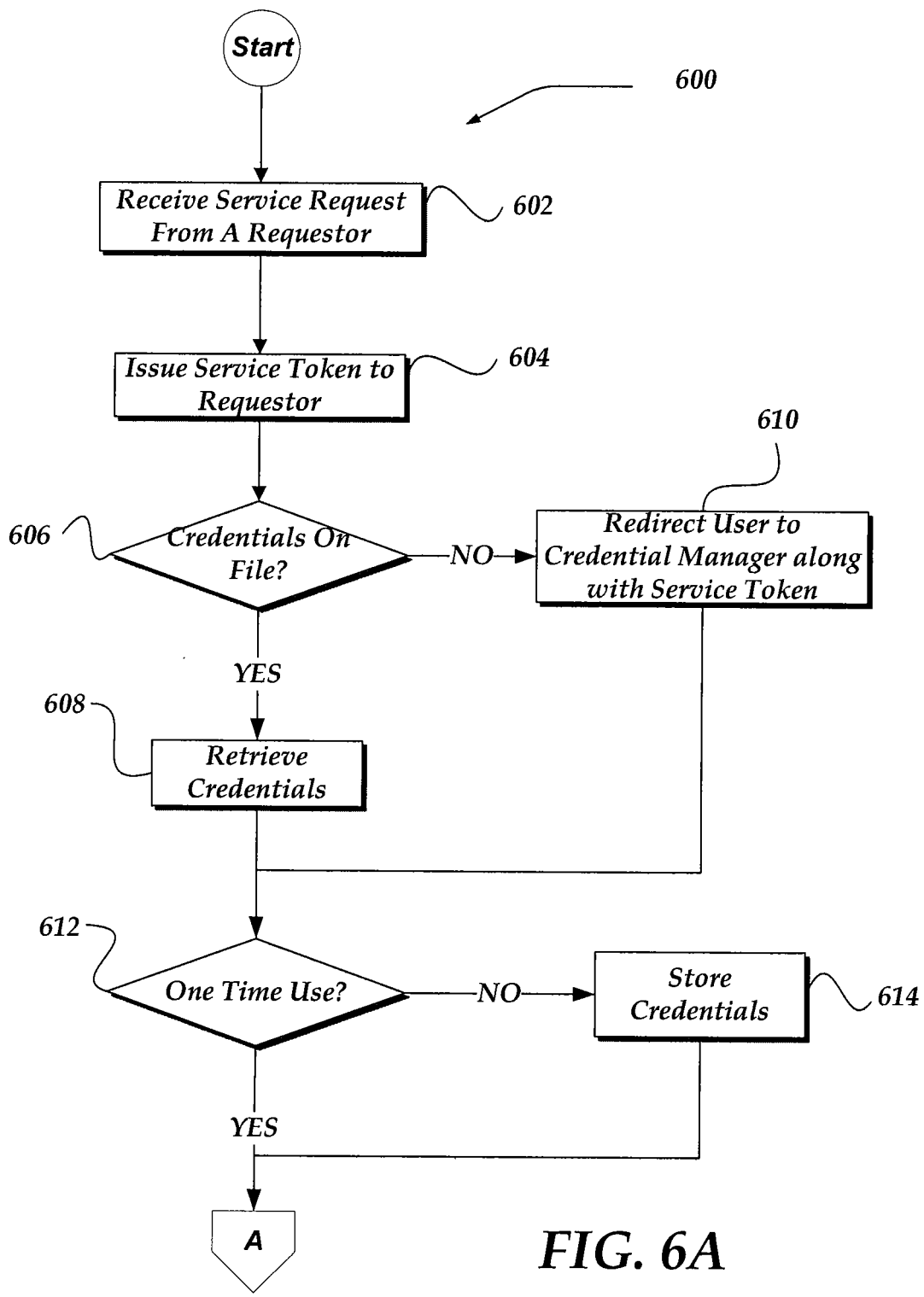
FIGS. 6A and 6B illustrate a flow diagram for one method of implementing the invention.

As another example, for the request protocol, services/data from the various resource networks may be available to other systems following an on-demand request (Aggregator API approach) as follows:

1. A property (requester) registers a service request with the Network Aggregator platform in block 602 (FIG. 6A) via, for example, the service map. Again, the request may be made in a global format. The platform may then issue a service token in return as shown in block 604. In general, a software token is a type of two-factor authentication security device that may be used to authorize the use of computer services. A service token is a form of software token.

2. In block 606, the aggregator determines if a corresponding, valid credential is on file. If so, then the credentials are retrieved in block 608. If no corresponding, valid credential is on file then:

a. The user may be re-directed to a 3rd party credential management front-end along with the service token as shown in block 610. The front-end may determine if the necessary credentials are already on file and collect the credentials as necessary.

b. The Network Aggregator platform may make a request to the resource network to verify the credentials, if this needs to be done separately from the actual service request.

c. The Network Aggregator platform may determine whether the credentials are for one-time use or regular use, if permitted by the user, as shown in decision block 612. If for repeated or regular use then the credentials may be stored in block 614. The credentials may be associated with the requester for use with future aggregation requests.

d. The Network Aggregator platform may redirect the user back to the property with the service token.

Figure 6B:
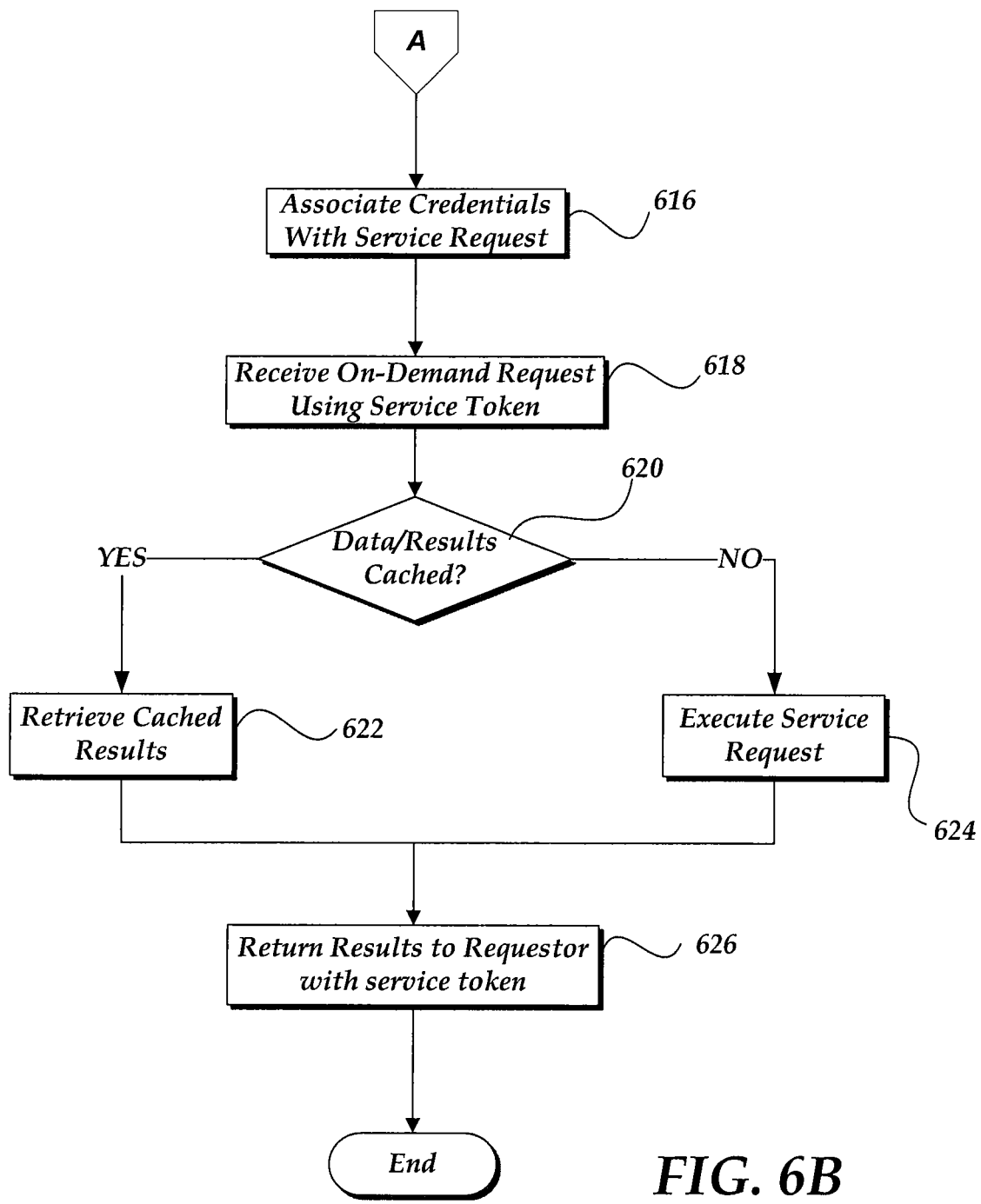

3. The credentials are associated with the service request in block 616 (FIG. 6B). The property may then make an on-demand request to the Aggregator Run-time Platform for the resource network information, data, services or the like using the service token in block 618.

4. The Network Aggregator platform may check if the resource is already available in the local cache in block 620 and retrieve the cached results in block 622, if applicable. If the resource is not cached, then the Network Aggregator may request the relevant resource from the resource network as necessary in block 624, set forth more specifically in FIGS. 7A and 7B. The results could be returned to the property directly in the response in block 626.

5. The Network Aggregator platform may also inject the results into a configurable set of properties/systems via the broadcasting framework.

6. The corresponding service request in the service map and any corresponding credentials set for one-time/ad-hoc usage become expired upon completion (or upon some maximum expiration time is reached, typically within 24 hours, whichever is earlier). The relevant entries in the service map and credential store are either removed immediately or via an off-line clean-up process.

In an alternative embodiment, the Network Aggregator platform may provide an alternative flow to avoid the need for a service token for relatively simple cases where step (1) would be replaced by one where the property would first make a service request to the Network Aggregator platform with sufficient information for the Network Aggregator to look up the necessary credentials and fulfill the actual service request, such that the service token is returned (and the remainder of the flow above is triggered) only if the necessary credentials are not available.

In a second embodiment for the request protocol, services/data from the various resource networks may be available to other systems following an on-demand request (storage API approach) as follows:

1. A property (requester) registers a service request with the Network Aggregator platform via, for example, the service map. The aggregator receives the request and issues a service token to the property in return.

2. The user may be redirected to a 3rd party credential management front-end along with the service token. The front-end determines if the necessary credentials are already on file and collects the credentials as necessary.

3. The Network Aggregator platform may store the credentials, associate the credentials entry with the service request, and may set the credentials for one-time use as appropriate. If there is already a corresponding credential that could be use on a regular basis, there is no need to create a separate one-time credential.

4. The Network Aggregator platform may check if the data/results are already available in any cache/storage and requests the relevant services from the source network as necessary.

5. Where the request has been fulfilled previously, the Network Aggregator platform injects the results into the appropriate storage and/or a configurable set of properties/systems via the broadcasting framework, in such a way that the relevant processes that follow could read the necessary data.

6. The Network Aggregator platform redirects the user back to the property (via some callback URL) with the service token.

7. The property (or some downstream process) calls the appropriate data access API to retrieve the necessary data.

8. The corresponding service request in the service map and any corresponding credentials set for one-time/ad-hoc usage becomes expired upon completion (or upon some maximum expiration time is reached, typically within 24 hours, whichever is earlier). The relevant entries in the service map and credential store are either removed immediately or via an off-line clean-up process.

9. The property is responsible for making appropriate API calls to clear any temporary storage that are reserved exclusively for this particular request. Such an arrangement is set up ahead of time with the property. Any left-over (e.g. due to broken redirect) would be cleared via an off-line process.

In yet another embodiment, the system may handle off-line scheduled requests as follows:

1. The property works out the service/data requirements with the Network Aggregator team to set up an appropriate scheduling scheme.

2. The adaptive scheduler makes a request to the Aggregator Run-time Platform at the appropriate time to request the relevant services from the source networks.

3. The results are either pushed directly to the property, stored in a temporary storage from which the property could retrieve upon notification, or pushed to the relevant data/service platforms that in turn provides a data access model for the properties that are interested.

Figure 7A:
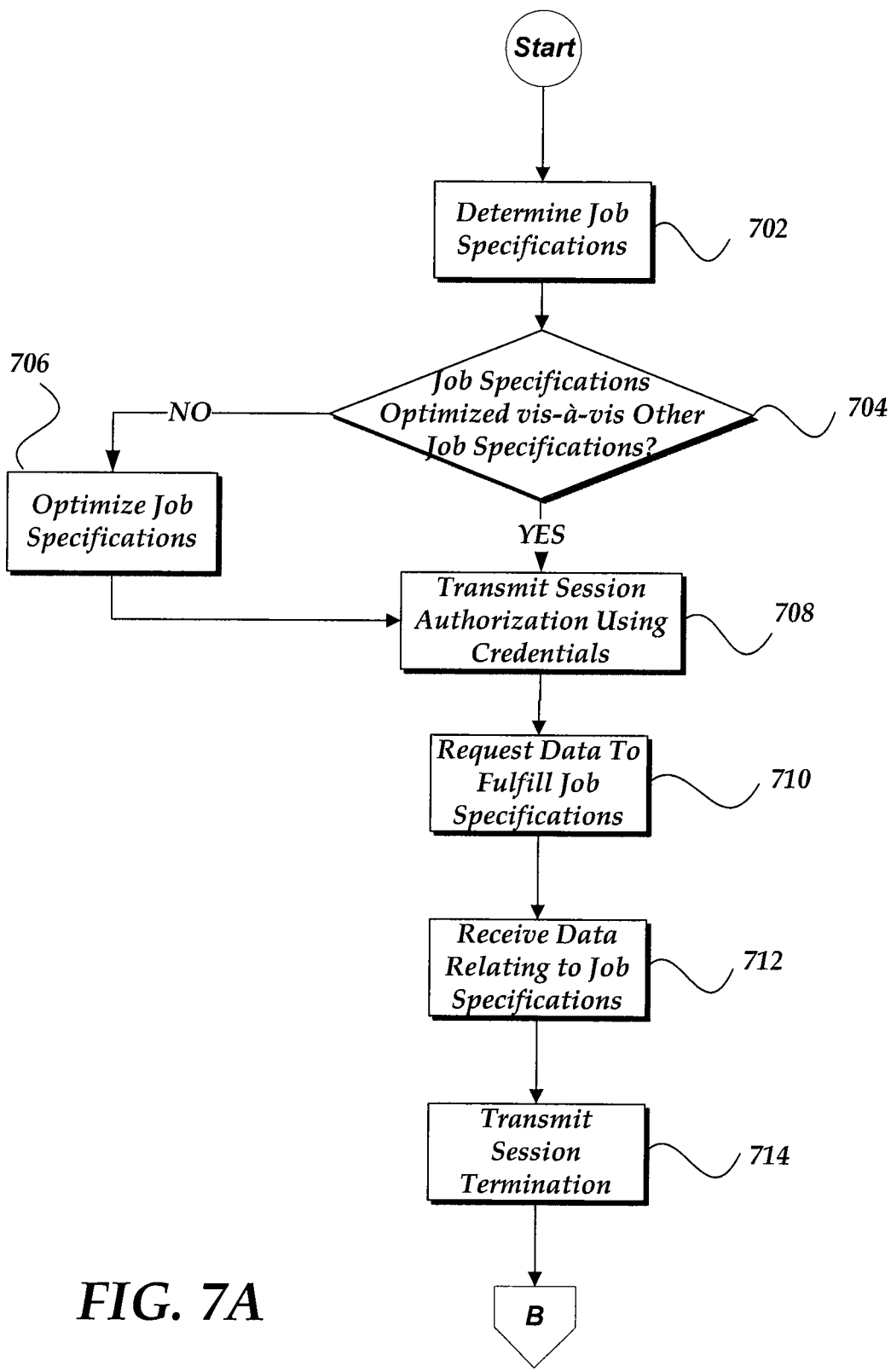
FIGS. 7A and 7B illustrate a flow diagram for one method of implementing one aspect of the invention.
Figure 7B:
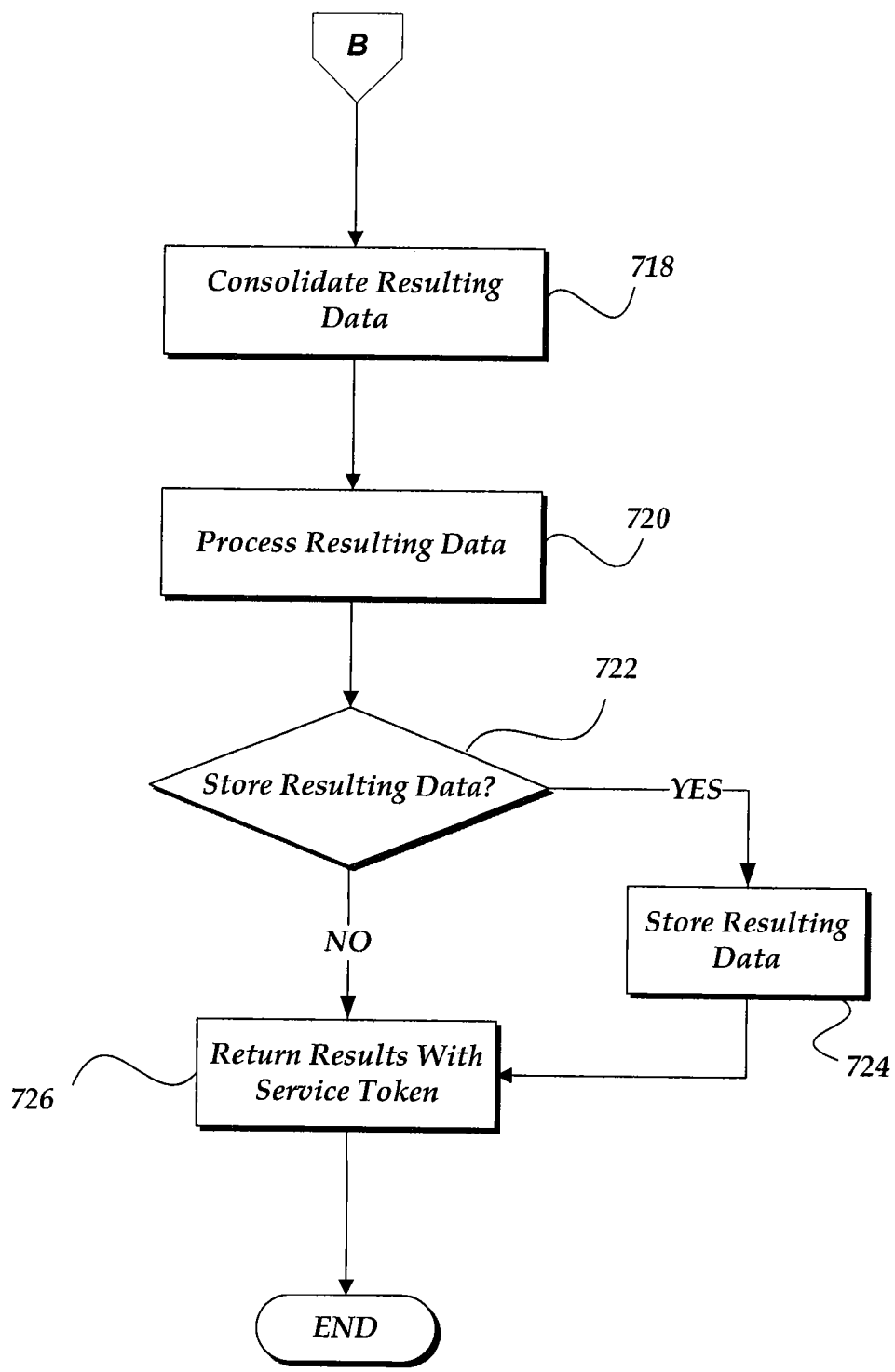

One aspect of the invention is shown in FIGS. 7A and 7B. These figures show one embodiment of the flow for executing an aggregation request. In executing the service request, the aggregator first determines the job specifications in block 702. The job specifications generally are those steps that are required in fulfilling the aggregation request. The aggregator may determine whether the aggregator request is optimized with respect to other aggregation requests as shown in decision block 704. If not, then the aggregator may optimize the job specifications in block 706. Optimization may occur by combining redundant or concurrent job requests. For example, simultaneous requests for overlapping data from the same data source may be combined into one job specification and executed as one job. Once the data is retrieved, the results may be parsed, combined with other results or the like to fulfill the various aggregation requests. Once the job specifications are complete, the aggregator executes the process of information, service or data extraction. The aggregator authorizes the session by providing the credentials to the resource in block 708. The credentials provide the aggregator with access to the resource. Next, the aggregator pulls the information, data or service from the resource as shown in block 712. Once all of the information, data or services are retrieved from the resource, the session is terminated as shown in block 714.

The resulting information, data or service may be consolidated, merged, parsed or otherwise processed with respect to other retrieved resources that were the result of other aggregation requests as shown in block 718. The resource set may then be formatted to a standard format, a proprietary or other format readable by the requester or otherwise processed to provide results sought by the aggregation request as shown in block 720. In decision block 722, the aggregator determines whether the aggregation request results should be stored. If the results may be stored as shown in block 724. The results may be stored in association with the aggregation request or in association with the requester. The stored results may be used to optimize and/or respond to other aggregation requests. The results along with the service token are then provided to the requestor in block 726 to fulfill the aggregation request.

Source Network Identifier

The aggregation of information from several different source networks may be simplified by using a common format. Thus, a common, global scheme may be used to identify source networks for access and aggregation. In one example, the name of the source network identifier in a resource path may be indicated by the use of the term "source" or /"sources" followed by the source network identifier (e.g. /v1/agg/user/{guid}/connection/source/www.facebook.com/ . . . ). This ensures that various systems, both internal and external to the aggregator network, have a consistent and compatible way of referring to the source networks or data sources. In one embodiment, the source network identifier may be any Internet domain that uniquely identifies the source network.

There may be a common, global scheme of identifying entities or resources (e.g. persons or social data) contained within source or non-native networks, even if the data is not on the native or aggregator networks. This allows an open network aggregation where services and infrastructure could be built on top of the aggregate network without necessarily migrating users and data to the aggregator network. For example, users may communicate with their friends on source or non-native networks without having the friends migrate to the user's network first, which typically require the friends to go through an additional invitation flow. As another example, users may see all of their photo albums on the Internet without first porting all of their photos to the native photo sharing entity.

There are various ways of referencing entities in non-native networks. As one example, user accounts on non-native networks may be referenced by a tuple ({source}, {idtype}, {id}),
where:
{source} is the source network identifier.
{idtype} is one of:

"uid" (user identification): The official, canonical account identifier on the source network (e.g. Facebook user identification). This is the same as the user's account login handle in some source networks.

"hdl" (account handle): An account handle on the source network (only used when the uid is not available)

{id} is the actual ID string of the given ID type.

Non-user network entities are referenced by resource paths that follow a common data schema. Generally, entities should be referable by a URI. Entity types of common interest should be representable by a tuple ({source}, {idtype}, {id}), where {idtype} is a semantic type identifier. The {source} and {idtype} may be applied as property names within micro-formats, where the {id} then becomes the value of the underlying resource. In the general case, {id} may be a URI reference, a global identifier like a GUID, or other data values depending on the specification of the given data type.

Non-network common entities such as first name, email address, telephone number, etc. are generally covered by a corresponding open standard. For instance, the aforementioned entities have corresponding micro-formats (see heard) as well as vcard representation. The representation to use depends on the content type stated or requested.

Storage Strategy

After services or data are converted from a given source network into an internal form, the resulting data may be processed further and distributed over one or more properties or service platforms. The Network Aggregator platform itself does not necessarily need to provide the storage for subsequent access. In general, a natural classification of such data (e.g. profiles, social connections, contacts, vitality, etc.) is first determined, and then the system is aligned to further process and maintain the resulting data as necessary. However, in some cases, the same set of data may need to be sent to more than one system. For instance, contacts data may need to be sent to both the Address Book system (to merge off-network contacts data directly into the native Address Book) and a social connections recommendation engine (social activator) to identify valuable connections, while the Network Aggregator platform might not need to maintain any additional storage other than possibly a working cache in some occasions.

Here are a few examples of other exceptions where the Network Aggregator may provide storage for off-network data:

Meta-data: In some cases, meta-data that are specific to off-network communications (modification history, read off-set, etc.) could be hard to incorporate in the core service platform outside of the Network Aggregator.

Local/Temporary cache: A local/temporary cache within the Network Aggregator may be needed if:

The service or data schema from the source network is substantially different from the internal, canonical schema of the native network The data/results from the source network is large and cannot be maintained efficiently without explicit storage The results from the source network need to be sent to more than one property. For example, the broadcasting framework may pull data from the temporary store to construct the messages to downstream properties rather than keeping large copies of data in log files, message queues . . . etc.

Any storage solution may also include an appropriate scheme to clean up the data when the data is no longer needed.

In some cases, an external aggregator (e.g. Plaxo or TrueSwitch) could be used as the data source or hub for other source networks (e.g. Google, Microsoft Live, etc.) via a special arrangement with such aggregate service provider.

In such cases, the immediate source network identifier may refer to the external aggregator and the user credential (if any) would be one for authentication into the external aggregator platform. The user would be asked for permission to use such an external aggregator in case non-public data is involved. The actual request on the target source network may be specified as service parameters in the request to the external aggregator. The Network Aggregator platform should be able to differentiate the data in the results based on the target source network. For example, if a request is made to Plaxo to obtain social data on the Google network for a given Google account (e.g. user@gmail.com), one should be able to refer to the data on the Google account via an account reference such as urn:agg:www.google.com:uid:user@gmail.com, even though there could be meta-data that indicates that the data were obtained via the account handle urn:agg:www.plaxo.com:hdl:user@xyz.com on Plaxo.

Opening up Network Access to $3^{rd}$ Parties

The Network Aggregator framework may be open to external, 3rd party consumers such that the market decides how the Network Aggregator would be used and what usages make sense for the developers. This essentially allows service providers to expose their own set of services to other developers, and triggers a self-evolving eco-system whereby customers, application developers, service providers, publishers, and advertisers create value for one another.

Apart from a model where a common pipeline/proxy for service or data transformation/aggregation between networks via special partnership or developer integration process is provided, the Network Aggregator may also be open to $3^{rd}$ party consumers and developers via an application platform (e.g. Yahoo! Application Platform, OpenSocial Application Platform, etc.). The following is an example of how this could be achieved.

1. Assume a web application Z from 3rd party X wants to query data from a given source network N (e.g., Facebook)
2. When the user installs the application, an access token (a software token) is granted to X for the application (for access to Social Directory, Network Aggregator, etc.).
3. The application platform detects that the application requires access to some given services in source network N and creates a dialog that contains the Network Aggregator UI.
4. The Network Aggregator UI facilitates the authorization process with source network N
5. The user is asked to install a "Aggregator Network Conduit" (or other name as appropriate) to access source network N, which is a shared pipe assigned exclusively for the Network Aggregator. The Network Aggregator receives a 3-legged access token from N that it would store in the 3rd party Credential Store and use to access source network later. This token for the conduit does not need to have a notion of the 3rd party X or application Z in itself. In the case of Facebook or any other application platform, such a conduit may be implemented in the form of an application on such platform. In other cases, it may be an OAuth exchange or other appropriate mechanism supported by the source network. In a case where the source network does need to have a notion of X or Z, OAuth may be extended to support transitive auth with such information in the authorization header.
6. The Network Aggregator becomes the access gateway/proxy to N shared by systems in the aggregator network as well as 3rd party applications. Once the conduit is installed, the user should not need to install another conduit again for another web application that also wants access to N. It is also possible that the user may have already installed the conduit before for Social Connection Recommendation, Vitality Event Aggregation, or other purposes, in which case, the user would not be asked to install the conduit again.

7. The Network Aggregator framework includes a service map that determines how given source network services may be used for a given user along with other information needed by the Network Aggregator to facilitate the process. It may have the concept of "usage scopes" that indicates intended usages. For this case, the actual authorization for the application could be implemented as an OAuth consumer key scope (e.g. "agg:sid:{source service instance ID}") in an OAuth database that maps the application's consumer key to the corresponding entry in the service map that contains the service description being authorized (e.g. source network ID, source service type, usage scope, user ID, source network account ID, etc.). The "usage scope" could be a generic code such as "ext_app_proxy" in this example.

8. The user can go to a networks management UI to manage their network authorization settings at a later time. The top-level UI could be a central UI provided by the Network Aggregator. The application-level settings could be handled by the application platform (e.g. as a page that branches off the top-level UI) that in turn utilizes the Networks Management API from the Network Aggregator.

9. The application can now make query to source network via the application platform (e.g. Yahoo! Markup Language), various query languages (e.g. Yahoo! Query Language), or Web Services API calls. For the former cases, the application platform or query processor would construct the corresponding request to the Network Aggregator API with the application-specific access token that identifies the 3rd party and application. The Network Aggregator would look at the service map, verify the OAuth scope, and construct a corresponding request to source network N via the Aggregator Network Conduit accordingly.

In the above model, the Network Aggregator API would need to support application-specific access tokens.

There are a variety of other possible scenarios based on the user experiences. In principle, it is possible for a 3rd party developer to specify "network dependencies" when they register for API usage via the developer network, but the developer may be provided with some facility that would bring the user to the Network Aggregator dialog in the appropriate place (e.g., via a JavaScript widget that the developer may include on their web page). The subsequent source network service request may be done via a query language or Web Services API calls that interface with the Network Aggregator Run-time Platform. An alternative scheme would be to have the 3rd party developer X register an X=>N consumer key & secret on the aggregator network (which could be manual) and perform an OAuth exchange directly with service provider N. In this case, the aggregator network could make a request to N on behalf of X upon a request by X that includes the X=>N access token and access token secret. This request from X to the aggregator network would be signed using a separate set of X=>Aggregator Network OAuth credentials (2-legged if the user does not have an account on the aggregator network, 3-legged otherwise). This alternative is useful if X wants to take advantage of certain query language or other facilities the aggregator network provides on top of other 3rd party services but the user may not have an account on the aggregator network or there are reasons for X to do an OAuth with N independent of the aggregator network regardless.

There is also an Open Application Services model where a 3rd party service provider may provide an extension application (e.g. photo service extension, shopping services, review/rating services, music/media services, PIM services, etc.) that provides additional extended markups and APIs (JavaScript API, Web Services API, etc.) to other applications that are built on top of them. In these cases, the "container applications" may specify the given extension application as dependencies. The process could be set up similarly to the one above. However, the "Aggregator Network Conduit" installation becomes the installation of the extension application N with an OAuth-based process by which the aggregator network would generate an Aggregator Network<=>N access token for the extension application to access services from the aggregator network and for the aggregator network to call the extended 3rd party services later. To facilitate this model, there may be an extensible application markup language and a corresponding definition language. The extended service provided is not necessarily restricted to data query and can be high-level functionalities with side effect or include UI components provided by the 3rd party.

Network Access Flow Control & Rate Limiting

The rate of access to a given network or data source may be controlled by a centralized rate limiting service that is used by the communication modules (e.g. auth/pull modules) to determine whether further access to a given network is allowed. Communication with the rate limiting service may be encapsulated by the network access client used by these modules. In this case, the network access client attempts to obtain permission from the rating limiting service before making a network access call. The network access client may also track the relevant call statistics via the rate limiting service. In the case that access to a network is denied, the status would be propagated back to the end-points, or consumed offline via the broadcasting engine. The processes that govern the end-points or the scheduler may then refine their strategies for subsequent requests to the Aggregator Run-Time Platform based on the results reported.

Ideally, the aggregator run time platform should have features to queue up requests that come in a short burst and implement strategies to smooth out the request patterns within given thresholds (e.g. to maintain throughput to a certain number of requests per second per source IP address). In such cases, an error may only need to be returned when the queue or the wait time grows beyond some given limits (for instance). It would also be useful if the rate limiting service could issue warnings when the system is approaching certain limits. In cases where these features are unavailable, the scheduler or processes that control the end-points would need to make their best guess based on the errors returned from previous attempts.

The run-time queue aforementioned may also be used as a buffer to look ahead multiple requests (including one-time requests) in such a way that certain requests may be combined to optimize network utilization (e.g. for Facebook, a single FBML query may be used to serve multiple requests in one call).

Sufficient abuse prevention mechanism may be implemented at the end-points that make calls to the Aggregator Run-Time Platform. For instance, abusers may use the aggregator as a proxy to attack 3rd party networks, resulting in excessive access to such networks. Abuse filters may be set up in the corresponding front-end applications to detect and block such activities.

Adaptive Scheduler as Look-Ahead Optimization

The aggregator may also fulfill aggregation requests on a scheduled basis. An adaptive scheduler may make a request to the aggregator at appropriate times to request relevant services from source networks. The results are either pushed directly to the property, stored in a temporary storage from which the property could retrieve upon notification, or pushed to the relevant data/service platforms that in turn provides a data access model for the properties that are interested.

The scheduler determines when to make calls to the Aggregator Run-Time Platform for network requests that do not need to be executed real-time. For example, user information may be pulled from 3rd party networks and synchronized with the native systems on a regular basis. Different network requests for different users may need to be processed on a different schedule in order to utilize the networks optimally. Such schedules may be learned adaptively based on past data (e.g. historical traffic patterns and user attributes).

In principle, all network requests could be made on-demand given unlimited network bandwidth and processing power. Hence, the adaptive scheduler may be seen as a form of look-ahead optimization by which network requests are made ahead of time such that results are available by the time they are needed. For example, the Aggregator Run-Time Platform may keep track of how often certain data is changed in the source networks for different users by monitoring the data retrieved. Such data may then be used by an optimization engine that computes future pull frequencies (e.g. based on moving averages that are scaled with respect to overall rate limits and user/system specified priorities).

The scheduler may be a general package that can be used in various contexts. The scheduler may comprise a base scheduler that performs the actual timing and dispatch of events, a storage for the schedules and other parameters, and a standard interface for an optimization engine to update or configure the scheduler accordingly.

Publish & Subscribe Model

Certain networks may also be able to push data to the Aggregator Run-Time Platform that may then distribute to other downstream properties/systems. Such a scheme may lead to better data availability and network utilization than a corresponding pull model where the aggregator platform has to guess when data is changed or available on the source networks. Requests from the source network may be kept in a run-time queue to control the flow in the Aggregator Run-Time Platform and possibly allow grouping and batch processing of the requests.

For instance, the source network push model may be done in one of the following ways:

The source network calls a standard push interface the Aggregator Run-Time Platform provides to push data to the aggregator.

The source network calls a standard ping interface the Aggregator Run-Time Platform provides to notify the aggregator of a source network event. The Aggregator Run-time Platform then makes an appropriate request to the source network to fulfill a configured set of services (e.g. to obtain the vitality data from the source network upon notification of a user event having occurred in the source network).

The aggregator platform subscribes to a push/ping interface the source network provides and transforms/normalizes any received data accordingly. This technique may be used when the source network has its own interface specification and is not able to implement an alternative interface from the aggregator.

The notification from the Aggregator Run-time Platform to downstream systems may be done via a broadcasting engine that is part of an extendable workflow/pipelining plug-in architecture that could be adapted to various data processing needs. The downstream systems would either receive the data pushed from the Aggregator Run-time Platform or a notification to pull data from specified sources (e.g. via an API to an internal broadcasting data store). The downstream systems should generally implement a standard push/ping interface provided by the Aggregator Run-time Platform. Such an interface could be asynchronous (e.g. via JMS) or synchronous (e.g. via web services calls) depending on needs. However, there could also be cases where the broadcasting engine provides custom adaptation to interact with a downstream system in some specific ways as necessary.

Plug-In Architecture

The Aggregator Run-Time Platform and broadcasting engine may be modeled on a free-form workflow or pipelining plug-in architecture, where the underlying processes are constructed by connection of "pipes" that take one or more input sources and send results via one or more output channels to whatever other pipe instances or end-points that need to consume them. Each pipe may also spin off one or more pipes internally to fulfill its responsibilities (e.g. to dispatch multiple concurrent pipelines to process various subsets of data).

Here are some examples of pipe modules for the aggregator platform:

Credential modules that provide the necessary credentials for authentication.

Pull modules that extract data from the source networks. There may be different classes of pull modules defined (e.g. based on types of protocols: RSS/ATOM over HTTP, XML/JSON over HTTP, HTML over HTTP with JavaScript execution, etc.).

Modules that interact with the source networks in other ways (e.g. pushing data to the source networks).

Modules that further transform the data retrieved from the source networks (e.g. micro-format extractors, XML filters, data normalizers, etc.).

Composite modules that perform higher order functions (e.g. universal contact extractors, profile extractors, user activity extractor, cross-network messaging modules, etc.) using the more elemental modules.

Pipes that send data to multiple processors in parallel or in sequence. Each of such processors corresponds to a separate pipeline.

Pipes that send data to different pipelines based on given conditions.

Pipes that save data into memory/storage.

Pipes that aggregate data from multiple pipelines.

Pipes that proxy messages to/from other platforms (e.g. libraries implemented in different languages, remote services, etc.).

Pipes that send data to downstream properties or systems based on given protocols.

There may be a standard representation language to define the pipelines. The specification of such pipelines may be generated dynamically or statically. However, such specification is generally encapsulated from the end points. The end points may specify what behaviors are needed from the Aggregator Run-time Platform via the service map or other configurations and communicate with the aggregator via external APIs. Internally, the aggregator may decide what pipelines to construct based on the requests.

Such a module framework encourages developers to share common semantics such as identity/entity reference formats. For instance developers may install an SDK that contain the plug-in framework and pull in the set of modules needed in such a way that they could add/extend functionalities, run, and test the end-to-end setup on their own machines. The resulting implementation may run on a hosted platform or deployed on some separate setup depending on the circumstances. In other words, the plug-in framework itself as well as some of the pipe modules may be re-used across contexts.

Broadcasting Engine

The broadcasting engine is designed to send various subsets of result data from the aggregator to entities that need to consume them. Each consumer subscribes to a particular type of result data stream that is configurable per subscription. Such a consumer may decide to store the data received in its own storage optimized for its needs. However, the various design teams should work together to avoid unnecessarily redundant storage from a global perspective. The data being sent to a subscriber can be information collected from the external networks, or augmented information computed via the aggregator.

The broadcasting engine needs to acknowledge receipt of the data from the aggregator, but the data broadcast itself may happen asynchronously and may not need to block the aggregator from moving forward (though it may be configured to work either way).

Certain private data being sent via the broadcasting engine may need to be encrypted where each subscriber needs to use a different secret for decryption. For very sensitive data, it may not be desirable to send the data via the broadcasting engine at all, in which case the data may only be allowed to be sent back to the caller of the aggregator or be stored in protected storage via secure protocols implemented in a local processor attached to the aggregator. Notification via the broadcasting engine may still be allowed in such cases, where the subscriber may then access the data via a secure interface to the storage.

Service Map

The service map provides a global mapping of the services from various networks to the utilization of such services by the aggregator network. This allows global oversight and management over usage of the various source networks and allows control interfaces that span across source network functionalities easily (e.g. a general networks management interface with customizable sets of options in different scenarios).

The service map is expected to be accessible to authorized entities via a common web services API provided by the networks management handler. It could also be accessed by the Network Aggregator system via a common library that exhibits the same behavior but integrates directly with the storage. The underlying storage should be a high performance distributed data store with distributed memory cache that could support a large number of service request (including one-time requests) efficiently.

There should be a networks management handler orchestrates the overall process of updating/querying the 3rd party user credential store, service map, and possibly updating the scheduler as necessary upon the user updating the service preferences.

A source service instance represents a particular setup to utilize a given service from a source network for a given scope of usages and a given account (if applicable). For example, it allows us to tell whether a user has opt-in to importing selected types of vitality events from a given network for vitality aggregation. Each source service instance follows its own lifecycle and may be enabled, suspended, or expired based on given conditions. It may also be associated with verification status that indicates the validity of the service instance. A service instance may be a setup that stays on indefinitely (e.g. periodic vitality import for vitality event aggregation) or used on ad-hoc/one-time basis for a very specific goal (e.g. to pull address book data from Google for one-time connections recommendation).

Source-level service definitions may be specified as a set of configuration files or database entries with an API built on top to provide information about the services from various source networks that are not user specific (e.g. what type of data and services are supported for each source network). Such information is usually relatively static/stable.

In cases where there are many more network communications that need to be done compared to the number of aggregator requests, it is possible for a communications module instance to be responsible for many network communications at the same time using light-weight mechanisms (e.g. multi-threading, non-blocking multi-I/O, etc.). Otherwise, the context memory could be used up easily. The aggregator would decide how to use the communication modules. The process that handles the results does not need to be loaded until the data are available from the source network.

The processed data collected or computed via the aggregator could be stored and accessed later by other systems via a common data access interface. Such an interface provides an abstraction of how the data storage is implemented, making the system more extensible in the future.

Scheduler

The scheduler determines when to make calls to the aggregator. For example, this is needed in cases where user information from 3rd party networks need to be pulled from such networks and synchronized with the native systems on a regular basis. It is possible that different data for a user needs to be extracted and processed on a different schedule. The scheduler should allow both recurring and one-off schedules to be made. It may also merge aggregator calls that can be made at the same time into one aggregator call such as events that can happen simultaneously for a given user.

Ideally the scheduler should be built as a general package that can be used in various contexts. The scheduler should implement a standard interface that is common among schedulers. Multiple instances of the scheduler with different configurations and optimization may be deployed given that such instances do not conflict with each other. For instance, there could be completely disajoint set of event data that may be pulled via mechanisms completely independent of the other processes and such data may be so massive that we might be better off processing them in batches that are optimized differently than other schedulers.

The scheduler may be configured by systems that have the intelligence to determine the optimal schedule based on past data. For instance, the schedule for vitality events may be optimized based on the historical frequencies of different types of events recorded for each user. The scheduler may comprise a sub-system that performs the actual timing and dispatch of events, a storage for the schedules and other parameters, and an interface for applications and business intelligence systems to update or configure the schedulers (e.g. based on historical data) accordingly.

Client Proxy

In some cases, various restrictions (legal, business, technical, etc.) may render brute-force server-side network requests infeasible. The Network Aggregator framework may leverage applications installed on the user desktop, mobile device, or other platforms as a conduit/proxy to communicate with the source networks.

Here are some examples of such usages:

A browser plug-in or mobile/desktop application that maintains the user's sessions with the source networks and proxies data by making service requests directly from the user's browser/desktop to the source networks and communicating with the Aggregator Run-time Platform in the background. This allows network traffic to be distributed across the users' machines and makes the network requests look as if the user is requesting them directly, which is useful for screen scraping or avoiding certain server-side network constraints such as IP address restrictions. Such a feature may be integrated into an overall client application that provides the aggregate service (instant messaging, vitality, photos/video, etc.). The data/results pushed to the aggregator may be interpreted and transformed via the pipelining plug-in framework on the Aggregator Run-time Platform.

An application installed on a 3rd party platform (e.g. Facebook or OpenSocial platforms) that proxies requests between the Aggregator Run-time Platform and the 3rd party platform. e.g. An aggregator network user may opt to install a Facebook conduit application that allows the aggregator to obtain friends lists, retrieve/send vitality events and online status from/to Facebook, etc. via the Facebook API that is only accessible from within a Facebook application.

A client proxy may be installed on the user's machine (e.g. as a browser plug-in or desktop application) to maintain the cookies or state information for the various networks of interests, and efficiently proxy data between the aggregator system and such networks. In this framework, data can be aggregated by the client proxy and limited pre-processing or filtering may also be done by the client before the data is sent to the aggregator system via the push interface. The aggregator in turn parses the data using the appropriate transformation modules as necessary and processes the resulting data accordingly. The client proxy should also support simultaneous calls to the multiple networks.

The aggregated data may be stored in a database provided by another system that governs the usage of such data. For example, the social vitality platform may use the aggregator to fetch users' vitality data from various social networks, but stores the data in its own storage such that all other entities access vitality data via the web services provided by the vitality platform. In this case, the vitality web services API may have a "source" dimension that identifies the social network such that web services filters and queries may be applied across networks via the vitality web services API and the end-points do not necessarily need to interact with the aggregator directly. The scheduler may serve as a look-ahead optimizer that accesses the various networks or data sources ahead of time to maximize the chance that the data in the cache/data store are of the required freshness when requested by the end-points.

In some cases, the external system that provides the actual data storage may also take over the responsibility of checking the data in the storage for freshness before making a call to the aggregator to obtain data from the target networks.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected is:

1. An apparatus for managing resources over a network, comprising:
    a transceiver to send and receive data over the network; and
    a processor that is operative to enable actions for:
        receiving an aggregation request for at least one resource from a requestor, wherein the aggregation request is arranged in a global format;
        employing a credential associated with the aggregation request to enable access to the at least one resource from at least one of a plurality of resources using a global resource identification scheme, wherein the at least one resource is on a non-native network;
        transforming the retrieved at least one resource into a resource set that is accessible to the requestor on a native network;
        receiving a multi-legged service token associated with the aggregation request from the requestor; and
        providing the requestor with rate limited access to the resource set on the native network, wherein a scheduler is operative to adaptively look ahead to optimize a pull frequency for the requestor to access the resource set based at least on an overall rate limit,
    wherein the requestor is provided access to the resource set based on the multi-legged service token.

2. The apparatus of claim 1, wherein the processor is further operative to enable actions for:
    receiving a notification from one of the plurality of resources that the retrieved at least one resource has been updated;
    employing a credential associated with the aggregation request to enable access to the revised at least one resource from at least one of the plurality of resources;
    transforming the revised at least one resource into a revised resource set that is accessible to the requestor; and providing the requestor with access to the revised resource set.

3. The apparatus of claim 1, wherein the resource set is in a global format.

4. The apparatus of claim 1, wherein the processor is further operative to enable actions for:
limiting concurrency of the aggregation request with respect to at least one other aggregation request.

5. The apparatus of claim 1, wherein the processor is further operative to enable actions for:
combining the resource set with another resource set retrieved as a result of at least one other aggregation request.

6. The apparatus of claim 1, wherein the processor is further operative to enable actions for:
optimizing the performance of a network device through prioritization of the aggregation request with respect to at least one other aggregation request.

7. The apparatus of claim 1, wherein the processor is further operative to enable actions for:
accessing a service map to determine the availability of at least one of the plurality of resources to fulfill the aggregation request.

8. The apparatus of claim 1, wherein the processor is further operative to enable actions for:
providing at least part of a previously stored resource set to the requestor if at least part of the previously stored resource set is at least a partial response to the aggregation request.

9. The apparatus of claim 1, wherein the apparatus is a mobile device or a stationary computing device.

10. The apparatus of claim 1, wherein the processor is further operative to enable actions for:
adaptively scheduling retrieval of the resource from at least one of the plurality of resources.

11. A processor readable non-transitory storage medium that includes data and instructions wherein the execution of the instructions on a network device provides for managing resources over a network by enabling actions comprising:
receiving an aggregation request for at least one resource from a requestor wherein the aggregation request is arranged in a global format;
employing a credential associated with the aggregation request to enable access to the at least one resource from at least one of a plurality of resources using a global resource identification scheme, wherein the at least one resource is on a non-native network;
transforming the retrieved at least one resource into a resource set that is accessible to the requestor on a native network;
receiving a multi-legged service token associated with the aggregation request from the requestor; and
providing the requestor with rate limited access to the resource set on the native network, wherein a scheduler is operative to adaptively look ahead to optimize a pull frequency for the requestor to access the resource se based at least on an overall rate limit
wherein the requestor is provided access to the resource set based on the multi-legged service token.

12. The processor readable non-transitory storage medium to claim 11, wherein the execution of the instructions further enable actions for:
receiving a notification from one of the plurality of resources that the retrieved at least one resource has been updated;
employing a credential associated with the aggregation request to enable access to the revised at least one resource from at least one of the plurality of resources;
transforming the revised at least one resource into a revised resource set that is accessible to the requestor; and
providing the requestor with access to the revised resource set.

13. The processor readable non-transitory storage medium of claim 11, wherein the execution of the instructions further enable actions for:
limiting concurrency of the aggregation request with respect to at least one other aggregation request.

14. The processor readable non-transitory storage medium of claim 11, wherein the execution of the instructions further enable for:
optimizing the performance of the network device through prioritization of the aggregation request with respect to at least one other aggregation request.

15. The processor readable non-transitory storage medium of claim 11, wherein the execution of the instructions further enable actions for:
providing at least part of a previously stored resource set to the requestor if at least part of the previously sored resource set is at least a partial response to the aggregation request.

16. The processor readable non-transitory storage medium of claim 11, wherein the execution of the instructions further enable actions for:
adaptively scheduling retrieval of the resource from at least one of the plurality of resources.

17. A method for managing resources over a network, comprising:
receiving, by a processor, an aggregation request for data or services from a requestor, wherein the aggregation request is arranged in a global format;
employing, by the processor, a credential associated with the aggregation request to enable access to the at least one resource from at least one of a plurality of resources using a global resource identification scheme, wherein the at least one resource is on a non-native network;
transforming, by the processor, the retrieved at least one resource into a resource set that is accessible to the requestor on a native network;
receiving, by the processor, a multi-legged service token associated with the aggregation request from the requestor; and
providing, by the processor, the requestor with rate limited access to the resource set on the native network, wherein a scheduler is operative to adaptively look ahead to optimize a pull frequency for the requestor to access the resource set based at least on an overall rate limit,
wherein the requestor is provided access to the resource set based on the multi-legged service token.

18. The method of claim 17, further comprising:
receiving a notification from one of the plurality of resources that the retrieved at least one resource has been updated;
employing a credential associated with the aggregation request to enable access to the revised at least one resource from at least one of the plurality of resources;
transforming the revised at least one resource into a revised resource set that is accessible to the requester; and
providing the requestor with access to the revised resource set.

19. The method of claim 17, further comprising:
limiting concurrency of the aggregation request with respect to at least one other aggregation request.

20. The method of claim 17, further comprising:
optimizing the performance of a network device through prioritization of the aggregation request with respect to at least one other aggregation request.

21. The method of claim 17, further comprising:
providing at least part of a previously stored resource set to the requestor if at least part of the previously stored resource set is at least a partial response to the aggregation request.

22. The method of claim 17, further comprising:
adaptively scheduling retrieval of the resource from at least one of the plurality of resources.

23. A system for managing resources over a network, comprising:
a plurality of client devices, wherein each client device is configured to communicate over the network; and
a server device that is in communication with the plurality of client devices, and is configured and arranged to perform actions, including:
receiving an aggregation request for data or services from a requestor, wherein the aggregation request is arranged in a global format;
employing a credential associated with the aggregation request to enable access to the at least one resource from at least one of a plurality of resources using a global resource identification scheme, wherein the at least one resource is on a non-native network;
transforming the retrieved at least one resource into a resource set that is accessible to the requestor on a native network;
receiving a multi-legged service token associated with the aggregation request from the requestor; and
providing the requestor with rate limited access to the resource set on the native network, wherein a scheduler is operative to adaptively look ahead to optimize a pull frequency for the requestor to access the resource set based at least on an overall rate limit,
wherein the requestor is provided access to the resource set based on the multi-legged service token.

24. The system of claim 23, wherein the server device is further configured and arranged to perform actions including:
receiving a notification from one of the plurality of resources that the retrieved at least one resource has been updated;
employing a credential associated with the aggregation request to enable access to the revised at least one resource from at least one of the plurality of resources;
transforming the revised at least one resource into a revised resource set that is accessible to the requestor; and
providing the requestor with access to the revised resource set.

25. The system of claim 23, wherein the server device is further configured and arranged to perform actions including:
limiting concurrency of the aggregation request with respect to at least one other aggregation request.

26. The system of claim 23, wherein the server device is further configured and arranged to perform actions including:
optimizing the performance of a network device through prioritization of the aggregation request with respect to at least one other aggregation request.

27. The system of claim 23, wherein the server device is further configured and arranged to perform actions including:
providing at least part of a previously stored resource set to the requester if at least part of the previously stored resource set is at least a partial response to the aggregation request.

28. The system of claim 23, wherein the server device is further configured and arranged to perform actions including:
adaptively scheduling retrieval of the resource from at least one of the plurality of resources.

* * * * *